US012458808B2

(12) United States Patent
Leyde et al.

(10) Patent No.: US 12,458,808 B2
(45) Date of Patent: Nov. 4, 2025

(54) THERAPY SYSTEMS WITH QUANTIFIED BIOMARKER TARGETING, INCLUDING FOR EPILEPSY TREATMENT, AND ASSOCIATED SYSTEMS AND METHODS

(71) Applicant: Cadence Neuroscience, Inc., Redmond, WA (US)

(72) Inventors: Kent Leyde, Redmond, WA (US); Brian Lundstrom, Redmond, WA (US); Gregory Worrell, Rochester, MN (US); Squire Matthew Stead, Bozeman, MT (US); Warren Douglas Sheffield, Redmond, WA (US)

(73) Assignees: Cadence Neuroscience, Inc., Redmond, WA (US); Mayo Foundation for Medical Education and Research, Rochester, MN (US)

( * ) Notice: Subject to any disclaimer, the term of this patent is extended or adjusted under 35 U.S.C. 154(b) by 1137 days.

(21) Appl. No.: 17/240,746

(22) Filed: Apr. 26, 2021

(65) Prior Publication Data

US 2021/0346709 A1    Nov. 11, 2021

Related U.S. Application Data

(60) Provisional application No. 63/016,257, filed on Apr. 27, 2020.

(51) Int. Cl.
*A61N 2/00* (2006.01)
*A61B 5/00* (2006.01)
(Continued)

(52) U.S. Cl.
CPC .......... *A61N 2/002* (2013.01); *A61N 1/36064* (2013.01); *A61N 1/36135* (2013.01);
(Continued)

(58) Field of Classification Search
CPC ............... A61N 2/002; A61N 1/36064; A61N 1/36135; A61N 1/36157; A61N 1/36171;
(Continued)

(56) References Cited

U.S. PATENT DOCUMENTS 6,591,138 B1    7/2003   Fischell et al.
7,302,298 B2   11/2007   Lowry et al.
(Continued)

FOREIGN PATENT DOCUMENTS

WO    WO-2014140432           9/2014
WO    WO-2014140432 A1 *     9/2014    ........... A61B 5/0476

OTHER PUBLICATIONS

International Search Report and Written Opinion for International Patent Application No. PCT/US21/29206, Applicant: Cadence Neuroscience, Inc., mailed Aug. 16, 2021, 17 pages.
(Continued)

*Primary Examiner* — Charles A Marmor, II
*Assistant Examiner* — Joshua Daryl D Lannu
(74) *Attorney, Agent, or Firm* — Perkins Coie LLP

(57) ABSTRACT

Therapy systems with quantified biomarker targeting, including for epilepsy treatment, and associated systems and methods, are disclosed. A representative computer-based method for establishing epilepsy treatment parameters for a patient includes receiving multiple indications of interictal EEG biomarkers over a period of time and processing the multiple indications to produce a processed biomarker. The processed biomarker is then used to identify at least one target location at the patient's brain to receive an electrical therapy signal to reduce or eliminate epileptic activity in the patient, and at least one additional signal delivery parameter in accordance with which the electrical therapy signal is to be delivered.

13 Claims, 13 Drawing Sheets

(51) Int. Cl.
*A61B 5/293* (2021.01)
*A61B 5/37* (2021.01)
*A61N 1/36* (2006.01)
*A61N 1/372* (2006.01)

(52) U.S. Cl.
CPC ..... *A61N 1/36157* (2013.01); *A61N 1/36171* (2013.01); *A61N 1/36175* (2013.01); *A61N 2/006* (2013.01)

(58) Field of Classification Search
CPC ............... A61N 1/36175; A61N 2/006; A61N 1/37241; A61B 5/37; A61B 5/293; A61B 5/4094; A61B 5/4836; A61B 5/686; A61B 5/6868

See application file for complete search history.

(56) References Cited

U.S. PATENT DOCUMENTS

| | | |
|---|---|---|
| 7,463,928 B2 | 12/2008 | Lee et al. |
| 7,941,202 B2 | 5/2011 | Hetke |
| 7,962,219 B2 | 6/2011 | Jaax et al. |
| 7,991,465 B2 | 8/2011 | Bartic |
| 8,150,522 B2 | 4/2012 | Eschauz |
| 8,190,251 B2 | 5/2012 | Molnar et al. |
| 8,447,406 B2 | 5/2013 | Wu et al. |
| 8,774,891 B1 | 7/2014 | Osa et al. |
| 8,855,775 B2 | 10/2014 | Leyde et al. |
| 8,868,172 B2 | 10/2014 | Leyde et al. |
| 8,914,115 B2 | 12/2014 | Giftakis et al. |
| 9,149,635 B2 | 10/2015 | Denison et al. |
| 9,409,022 B2 | 8/2016 | Jaax et al. |
| 9,788,744 B2 | 10/2017 | Bland et al. |
| 2005/0203366 A1 | 9/2005 | Donoghue et al. |
| 2008/0027346 A1 | 1/2008 | Litt |
| 2009/0118786 A1 | 5/2009 | Meadows et al. |
| 2009/0234419 A1 | 9/2009 | Machino |
| 2010/0145176 A1 | 6/2010 | Himes |
| 2010/0198297 A1* | 8/2010 | Cogan ................. A61B 5/0006 607/45 |
| 2010/0219820 A1 | 9/2010 | Skidmore et al. |
| 2010/0292602 A1 | 11/2010 | Worrell et al. |
| 2010/0301665 A1 | 12/2010 | White et al. |
| 2011/0208265 A1* | 8/2011 | Erickson ............ A61N 1/37241 607/46 |
| 2012/0245481 A1 | 9/2012 | Blanco |
| 2013/0144365 A1 | 6/2013 | Kipke et al. |
| 2013/0261489 A1 | 10/2013 | Putz |
| 2015/0216437 A1* | 8/2015 | Mihajlovic ......... A61B 5/7221 600/545 |
| 2015/0305643 A1 | 10/2015 | Negi et al. |
| 2016/0029916 A1 | 2/2016 | Putz |
| 2016/0120457 A1 | 5/2016 | Wu et al. |
| 2018/0085015 A1 | 3/2018 | Crowder et al. |
| 2019/0150774 A1* | 5/2019 | Brinkmann ......... A61B 5/4094 |
| 2022/0211312 A1 | 7/2022 | Brinkmann |

OTHER PUBLICATIONS

Extended European Search Report for European Patent Application No. 21796432.9, Applicant: Cadence Neuroscience, Inc., mailed Aug. 3, 2023, 6 pages.

Barkmeier et al., "High inter-reviewer variability of spike detection on intracranial EEG addressed by an automated multi-channel algorithm," Clin Neurophysiol, Jun. 2012, 19 pages.

Cimbalnik et al., "The CS algorithm: A novel method for high frequency oscillation detection in EEG," Journal of Neuroscience Methods, 2018, 11 pages.

* cited by examiner

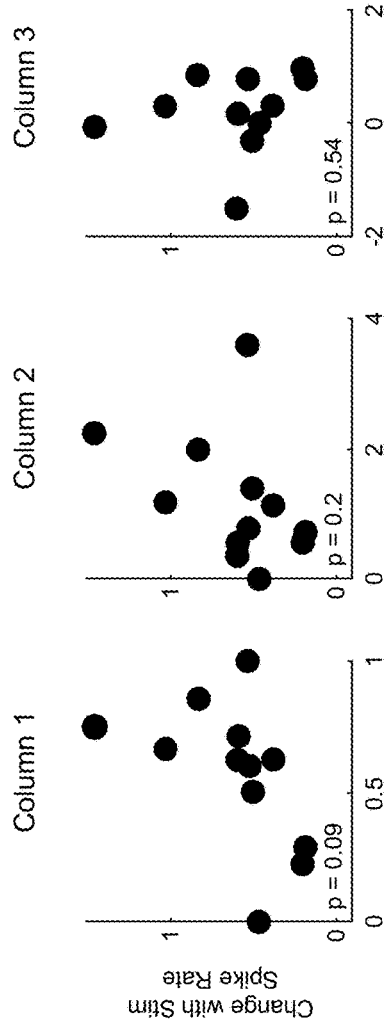
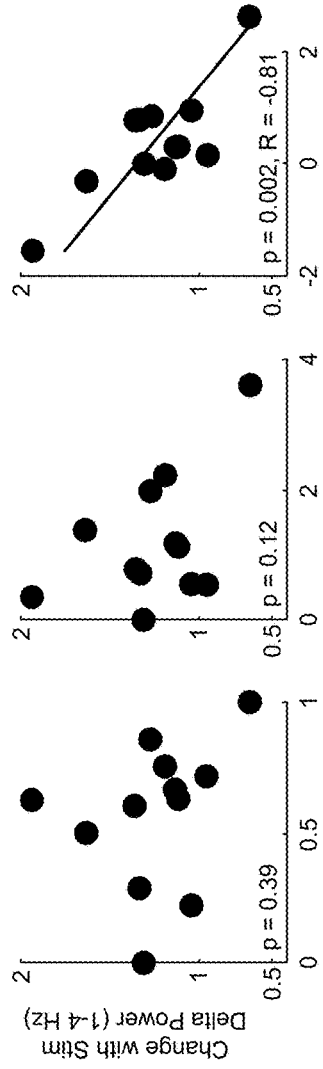
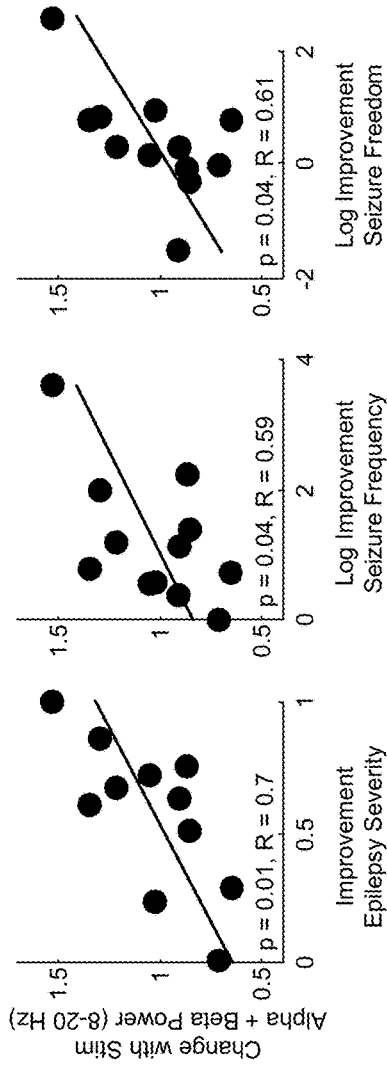
FIG. 7A
FIG. 7B
FIG. 7C

*FIG. 8*

THERAPY SYSTEMS WITH QUANTIFIED BIOMARKER TARGETING, INCLUDING FOR EPILEPSY TREATMENT, AND ASSOCIATED SYSTEMS AND METHODS

CROSS-REFERENCE TO RELATED APPLICATION

The present application claims priority to U.S. Provisional App. No. 63/016,257, titled "THERAPY SYSTEMS WITH QUANTIFIED BIOMARKER TARGETING, INCLUDING FOR EPILEPSY TREATMENT, AND ASSOCIATED SYSTEMS AND METHODS," which was filed on Apr. 27, 2020, and is incorporated herein by reference in its entirety.

TECHNICAL FIELD

The present technology is directed generally to therapy systems with quantified biomarker targeting, including for epilepsy treatment, and associated systems and methods.

BACKGROUND

Neurological disease affects millions of patients around the world. Numerous therapies have been studied for treating neurological disease, with varying levels of success. Epilepsy is a particularly difficult to treat disease that affects approximately 1% of the population. One distinguishing characteristic of epilepsy is the occurrence of seizures, which may result in the loss of awareness, violent convulsions, injury, and even death. Seizures are caused by hypersynchronous electrical activity in the brain and may occur frequently or infrequently. The damaging nature of seizures is compounded by the fact that they occur in a largely unpredictable manner.

Many epilepsy patients are treated using medications. Medications offer convenience, but are not effective for many patients and are often associated with significant side effects. Although many neurological diseases, such as epilepsy, are episodic in nature, medications are typically administered continuously and hence patients are burdened with side effects of the medication every day of their lives, not just when medication is required.

For a limited number of well-qualified patients with epilepsy, a surgical intervention may be an option. A surgical intervention typically requires permanently removing or injuring neural tissues and hence involves surgical risk and potential irreversible loss of neurological function.

Neuromodulation is a relatively new approach to treating neurological disease. Neuromodulation involves the application of electrical stimulation to neurological tissues at the cortex or other regions of the nervous system. The applied electrical signal can be used to activate, suppress, or modify neural activity. Access to targeted neural structures often requires the use of implanted devices. Or, in some cases for which targeted neural structures are close to the surface of the body, external devices may be used.

Multiple neuromodulation therapies exist for treating epilepsy and other neurological diseases. Neuromodulation therapies offer many potential advantages over alternative therapies, such as surgical interventions and medications. Neuromodulation therapies have limited risk, lower side effects, and, because they do not involve permanently removing or injuring neural tissues, are reversible. Neuromodulation therapies offer a degree of adjustability and flexibility that allows them to be adapted to different patients. Neuromodulation therapies exist for several neurological diseases including movement disorders (Parkinson's disease and essential tremor), pain, and epilepsy.

Several neuromodulation therapies have been studied for the treatment of epilepsy. One such therapy is Vagal Nerve Stimulation (VNS), wherein low levels of pulsatile electrical stimulation are applied to a patient's vagus nerve. VNS benefits from a consistent implant procedure, as electrical stimulation is always applied at the same location. Another advantage of VNS is that this location is relatively easy to access surgically.

Another neuromodulation therapy used for epilepsy is Responsive Neurological Stimulation (RNS). RNS operates by sensing the onset of epileptic activity, and responding by applying a low-level therapeutic pulsatile electrical stimulation. This involves sensing and stimulation of cortical and deep brain structures, which requires a more invasive surgical approach than VNS. RNS requires placing sensing and stimulation electrodes near the patient's seizure focus (or foci) or seizure onset zone—the area of brain believed to be the site of seizure initiation. The locations of seizure foci vary widely from patient to patient, and determining the location of the foci is difficult and may be inexact. Pathologic EEG biomarkers are not always localizing. For example, Interictal Epileptiform Discharges (IEDs) have been shown to occur in areas well removed from the seizure onset zone. In acknowledgement of these difficulties, and the risks of undergoing multiple surgical procedures to implant electrodes, RNS practitioners often implant extra sets of electrodes which are not connected to the RNS system, but can be connected optionally at a later date through use of a relatively less invasive surgical procedure.

Deep Brain Stimulation of the Anterior Nucleus of the Thalamus (DBS-ANT) is another neuromodulation therapy that has been demonstrated to offer potential benefit for epilepsy patients. Like VNS, DBS-ANT offers the advantage of a fixed electrode placement. Unlike VNS, DBS-ANT involves the stimulation of deep structures that are more difficult to surgically access, and therefore involves additional risks. Additionally, the anterior nucleus of the thalamus is small in size, approximately 3-5 mm in diameter. Accurate electrode placement in such a small target requires the talents of highly skilled neurosurgeons who have received specialized training.

Seizures or other symptoms of neurological disease may occur infrequently. This complicates efforts to identify safe and effective locations for therapy delivery and safe and effective therapy parameters. Chronic Subthreshold Cortical Stimulation (CSCS), which utilizes analysis of Interictal Epileptiform Discharges and actual seizure activity, has recently been shown to be a promising alternative to the foregoing neuromodulation therapies. CSCS requires a highly trained clinician to observe a patient's intracranial EEG (iEEG) during extended trial periods of electrical stimulation. Through trial and error, the clinician attempts to empirically find combinations of electrode location and stimulation parameters that result in suppression of Interictal Epileptiform Discharges (IEDs), a pathologic biomarker that is relatively easy for trained practitioners to identify visually. While CSCS has been shown capable of greatly reducing seizure frequency and even eliminating seizures, the procedure required to find appropriate electrode locations and determine the effects of trial stimulation is highly dependent on the clinician's ability to manually review large quantities of data and is therefore laborious, error prone, and susceptible to variation dependent on the individual performing the review. Accordingly, there remains a need for improved treatment modalities, for epilepsy and/or other neurological dysfunctions.

BRIEF DESCRIPTION OF THE DRAWINGS

FIG. 7A graphically illustrates changes in spike rate (y-axis), between baseline (no stimulation) and stimulation, and patient outcome (x-axis) in the form of epilepsy severity, seizure frequency, and seizure freedom.

FIG. 7B illustrates changes in delta power (y-axis), between baseline (no stimulation) and stimulation, and patient outcome (x-axis) in the form of epilepsy severity, seizure frequency, and seizure freedom.

FIG. 7C illustrates changes in alpha and beta power (y-axis), between baseline (no stimulation) and stimulation, and patient outcome (x-axis) in the form of epilepsy severity, seizure frequency, and seizure freedom.

FIG. 8 is a table illustrating efficacy for a number of channels or electrodes (y-axis) and trials (x-axis).

DETAILED DESCRIPTION

Figure 1:
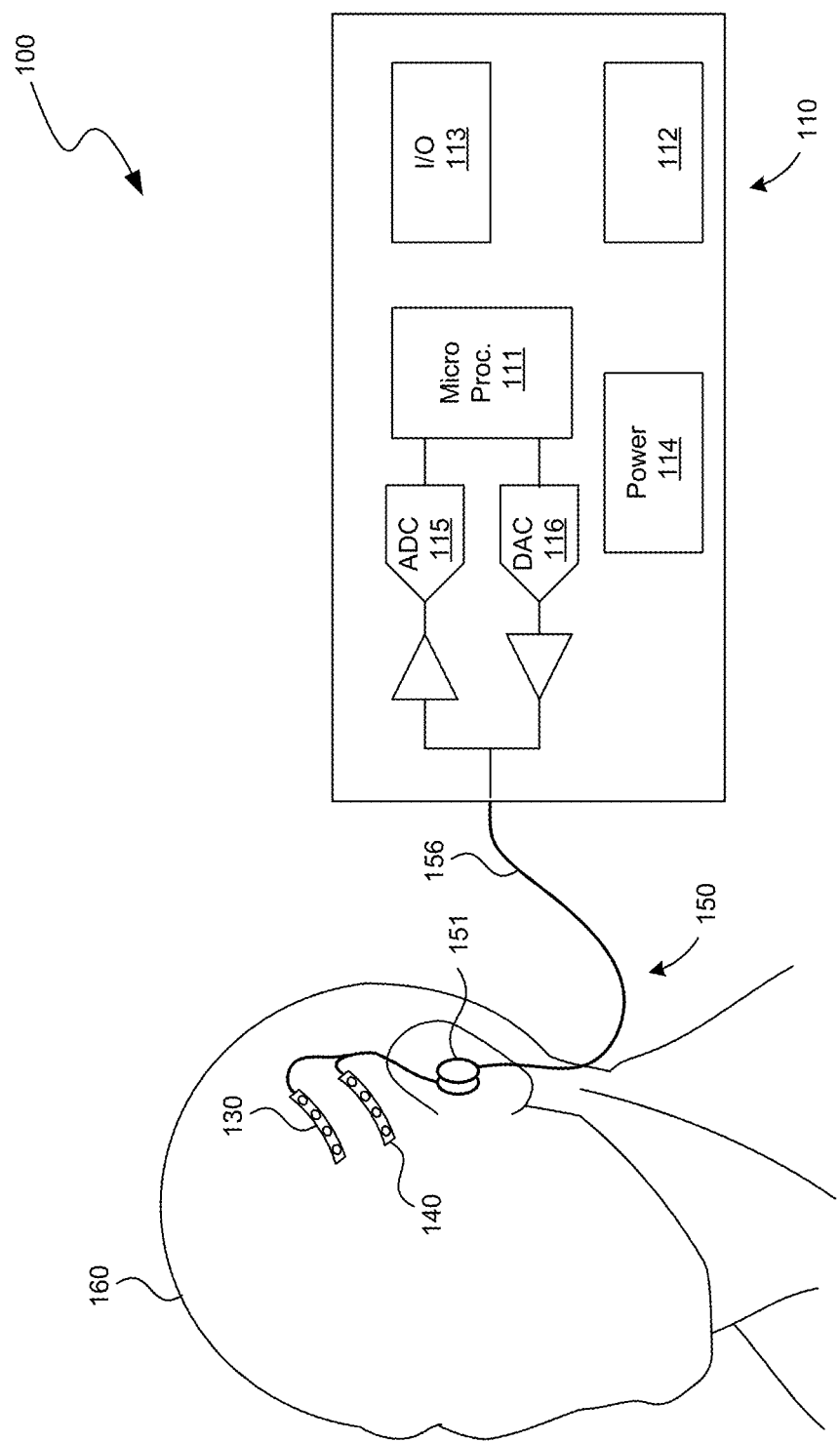
FIG. 1 illustrates a representative system having a signal delivery device, a sensing device, and an external device for biomarker quantification, in accordance with embodiments of the present technology.

The present technology is directed generally to therapy systems with quantified biomarker targeting, including for epilepsy treatment, and associated systems and methods. For example, in representative embodiments, the present technology includes automatically receiving biomarker data (e.g., interictal EEG data) and then processing (e.g., analyzing) the data to determine at least one location at the patient's brain suitable for receiving an electrical therapy signal directed to reducing or eliminating epileptic activity in the patient. Unlike some existing techniques, the data collected are not limited to data collected from epileptic seizure foci, but are instead collected from (e.g., exclusively from) sites that may or may not include the seizure onset zone, and that exhibit activity correlated with epileptic activity. Unlike some existing techniques, the biomarker activity can be monitored on a continuous or approximately continuous basis, as opposed to monitoring only seizure activity. Still further, the biomarker data are quantified in a manner that allows recommendations for therapy locations to be made automatically, and/or with significantly reduced clinician involvement. As a result, the overall process for establishing a treatment regimen for the patient can be significantly reduced.

Specific details of several embodiments of the present technology are described below with reference to epilepsy treatment devices to provide a thorough understanding of these embodiments, but other embodiments can use similar systems to treat other patient indications. Several details describing structures and/or processes that are well-known and often associated with electrical therapy delivery systems are not set forth in the following description for purposes of brevity. Moreover, although the following disclosure sets forth several embodiments of different aspects of the present technology, several other embodiments of the technology can have different configurations and/or different components than those described in this section. As such, the present technology may include other embodiments with additional elements and/or without several of the elements described below with reference to FIGS. 1-3 and 6A-10.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured and/or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Depending on the embodiment, data structures and transmissions of data particular to aspects of the technology can be encompassed within the scope of the present technology.

As used herein, and unless otherwise stated, the term "about" refers to a range of ±10% of the stated value. As used herein, the term "stimulation" is used generally to refer to electrical or electromagnetic signals that have a modulating effect on the target neural population. The effect can be inhibitory and/or excitatory, depending on factors that include the type of neuron affected by the signal.

Certain details related to the present technology are discussed in an article by Lundstrom et al, titled "Chronic subthreshold cortical stimulation and stimulation-related EEG biomarkers for focal epilepsy," *Brain Communications*, Volume 1, Issue 1, 2019 which is hereby incorporated by reference in its entirety.

FIG. 1 is a partially schematic illustration of a representative system 100 configured to sense information from a patient 160, and deliver electrical therapy signals to the patient 160. Accordingly, the system 100 can include a sensing device 140, a signal delivery device 130, and a controller 110 coupled to the sensing device 140 and the signal delivery device 130 via a communication link 150. In a representative system 100, the sensing device 140 includes one or more sensing electrodes that are positioned within the patient's skull. For example, the sensing device 140 can include multiple surface electrodes that are positioned on the surface of the dura surrounding the patient's brain, or the electrodes can include mini depth electrodes that are positioned subdurally but resting on the surface of the patient's brain, e.g., at the cortex. In any of these arrangements, the sensing device 140 can include some electrodes that are positioned temporarily during a trial period, and/or some electrodes that are permanently or semi-permanently implanted in the patient. For example, the sensing device 140 can include a large number of electrodes for use during a trial period, during which it is less certain which portions of the brain will produce signals used for long-term or chronic treatment. The number of electrodes can be reduced for chronic treatment. The same electrodes (through possibly fewer in number) can be used for both temporary and chronic sensing, or some or all of the trial sensing electrodes can be replaced with new sensing electrodes for chronic use.

The signal delivery device 130 can also include multiple electrodes, in this case, used to deliver, rather than sense electrical signals. The signal delivery parameters in accordance with which the signals are applied to the patient are selected to reduce, inhibit, and/or eliminate epileptic seizure activity, as described further below. The same or different signal delivery devices or portions of the signal delivery device can be used during the trial period and for chronic stimulation. In at least some cases, the electrodes used to deliver electrical signals can also be used to sense physiological electrical signals. For example, the system can sense physiological signals during breaks in the process of delivering electrical signals, and/or suitable filtering techniques can be used to distinguish physiologically-generated signals from therapeutic signals delivered to the patient.

The communication link 150 can include a percutaneous lead 152 in some representative embodiments. In other embodiments, the communication link 150 can include other elements, for example, a wireless communication link for sensing and/or delivering signals to the patient 160.

In any of the foregoing embodiments, the controller 110 can be configured for external use, for example, during a trial period. The controller 110 can include a processor 111, memory 112, input/output devices 113, and a power supply 114. The processor 111 can receive information (e.g., from the sensing device 140) and deliver therapeutic electrical signals (e.g., via the signal delivery device 130) to treat the patient. In particular embodiments, the controller 110 can include analog-to-digital converters 115 (e.g., ADCs) and/or digital-to-analog converters 116 (DACs) to facilitate sensing and delivering electrical signals.

Figure 2:
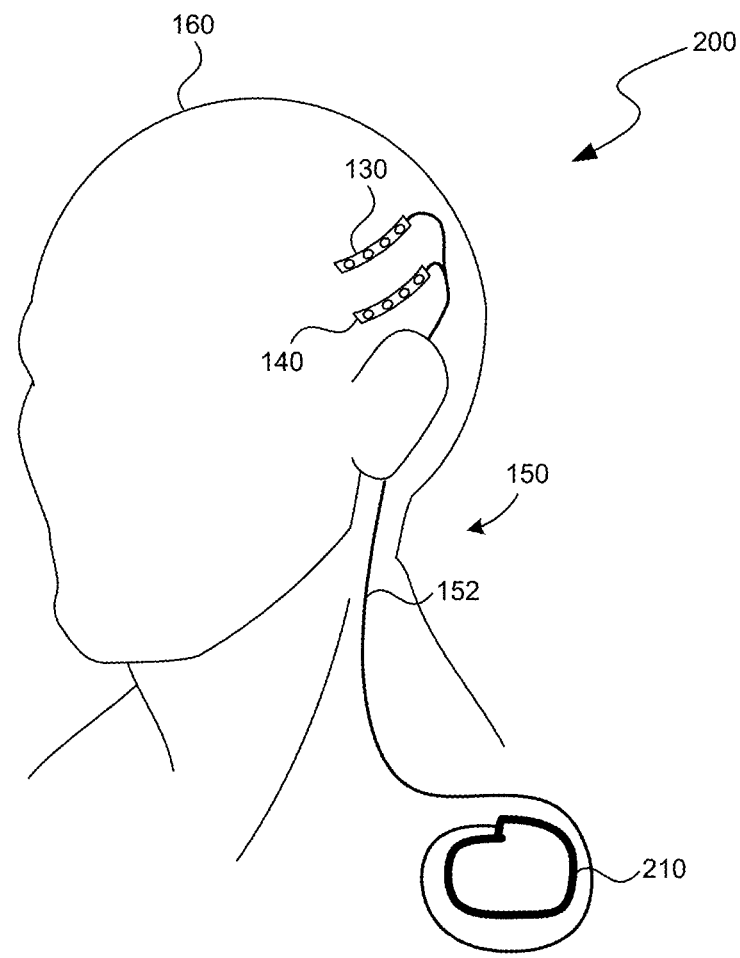
FIG. 2 illustrates a representative system having a signal delivery device, a sensing device, and an internal device for biomarker quantification, in accordance with embodiments of the present technology.

FIG. 2 is a partially schematic illustration of a system 200 having an implanted controller 210 that performs some or all of the functions of the external programmer 110 described above with reference to FIG. 1. Accordingly, the implanted controller 210 can be coupled to the sensing device 140 and the signal delivery device 130 via a communication link 150 that includes an implanted lead 152. In general, it is expected that an implanted lead 152 will provide more robust communication between the implanted controller 210 and the sensing device 140 and signal delivery device 130. However, in some embodiments, a wireless link can be used between the controller 210 and the sensing and delivery devices 140, 130. In any of these embodiments, the implanted controller 210 can perform functions including sensing and recording information from the sensing device 140, quantifying biomarker information based on the information received from the sensing device 140, and/or selecting and generating electrical therapy signals provided to the signal delivery device 130.

Figure 3:
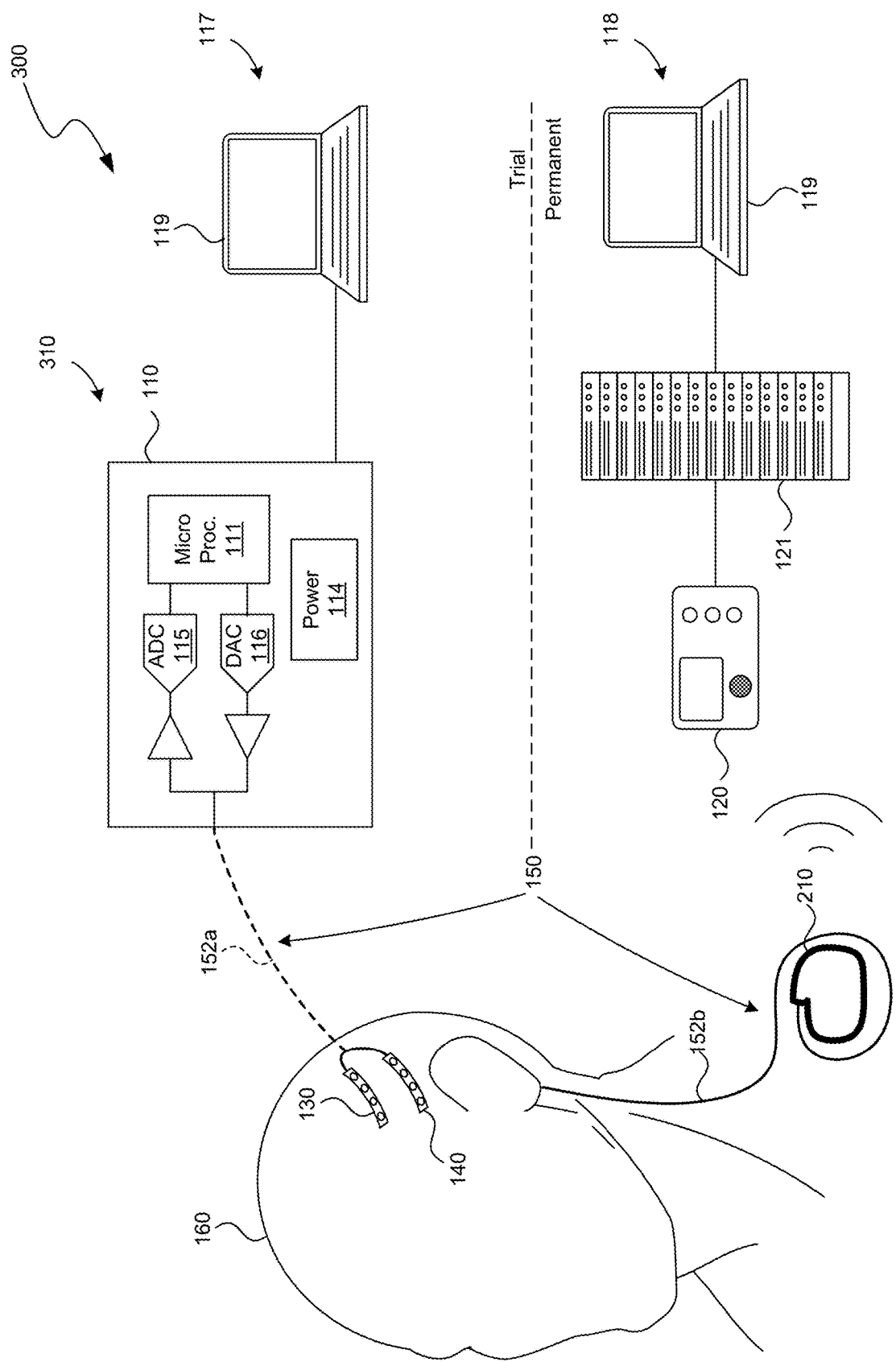
FIG. 3 illustrates a representative system in which elements for biomarker quantification and monitoring are positioned internally and/or externally, in accordance with embodiments of the present technology.

FIG. 3 is a partially schematic illustration of a system 300 that includes a combination of implanted and external components, in accordance with embodiments of the present technology. In at least some embodiments, several of the external components are used during the trial period only and are accordingly referred to as trial elements 117. Several of the components are used during the chronic or permanent implant period, and are referred to generally as permanent elements 118. However, depending on the embodiment, selected elements identified as trial elements may be used on a permanent basis, and selected elements identified as permanent elements may be used on a trial basis.

In general, the system 300 includes a controller 310, which in turn includes an external controller 110 and an implanted controller 210. The overall controller 310 communicates with the implanted sensing device 140 and signal device delivery device 130 via a communication link 150 that can include a first lead 152a coupled between the external controller 110 and the patient, and a second lead 152b also coupled between the implanted controller 210 and the patient 160. The external controller 110 can be coupled to a clinician interface 119 (e.g., a laptop or other computer) to display information and allow the clinician to interface with the external controller 110. The implanted controller 210 can be coupled to a patient interface device 120 (e.g., via a wireless link) which allows the patient to control some or all of the parameters in accordance with which the therapy signals are delivered to the signal delivery device 130. The system 300 can further include a remote computing/storage facility 121 that collects data from the patient interface device 120 and provides the information to the same or a different clinician interface 119. This arrangement allows the computational tasks that are memory-intensive and/or energy-intensive to be offloaded from the implanted controller 210 to external devices, thus reducing the volume of the implanted controller 210 and/or the amount of energy required to power the implanted controller 210.

Both the implanted controller 210 and the external controller 110 can include provisions for recording the data sensed by the sensing device 140. In particular, the sensing device 140 can detect EEG signals which the controllers 110, 210 record. The controllers 110, 210 can be configured to avoid DC blocking capacitors which may exacerbate interference from electrical stimulation. Such blocking capacitors are typically used to reject DC offsets due to potentials present at the interface between the electrodes and the patient's tissue, but must also be configured to pass relatively low frequency EEG signals, which may have a frequency of, for example, 0.1 Hz. Accordingly, blocking capacitors may be very slow to recover from the large transients associated with the applied therapy signals. To avoid blocking capacitors, representative systems include a DC coupled architecture. This arrangement may further include a high dynamic range ADC 115 to account for offset potentials.

In any of the foregoing embodiments, the overall controller 310 (e.g., the implanted controller 210 and/or external controller 110) can collect sensed data (e.g., EEG signals), quantify the received data, and control the therapy signal. As discussed above, the implanted controller 210 performs many of the functions of the external controller 110, but on an on-going (e.g., chronic) basis rather than a temporary and/or trial basis. The information collected from the implanted controller 210 can be used not only for the particular patient 160 in which the device is implanted, but to provide data that may aid therapy delivery for other patients as well.

Figure 4:
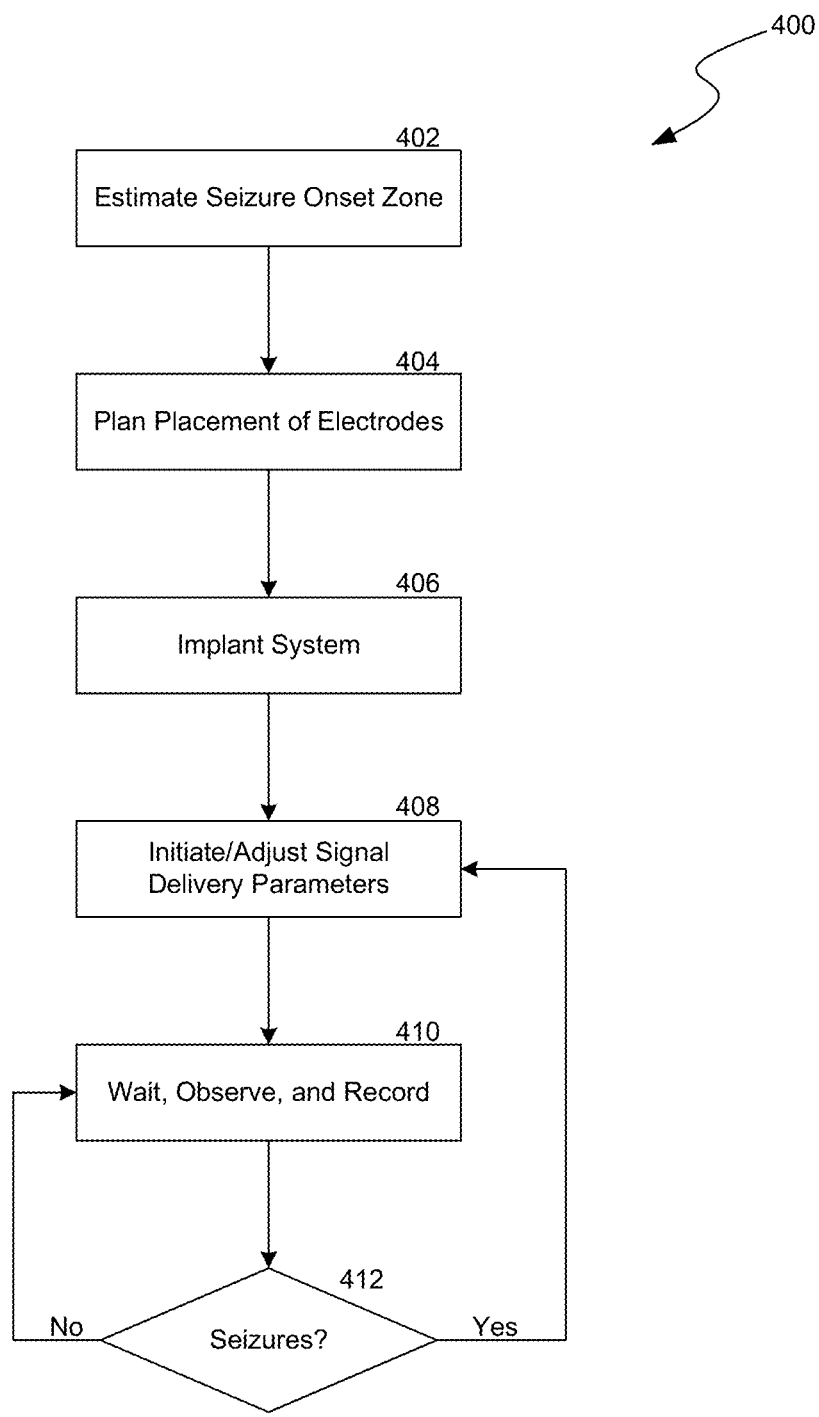
FIG. 4 illustrates a typical sequence for system placement using localization of a seizure focus, in accordance with the prior art.

FIG. 4 illustrates a typical conventional process 400 used to apply responsive neural stimulation (RNS) in accordance with the prior art. In step 402, the seizure onset zone (the area of brain where seizure activity begins) is estimated. Determining the location or locations of the seizure onset zone is a requirement for surgical interventions for epilepsy (one of the oldest techniques for treating epilepsy) and hence the techniques used to determine seizure onset zone are mature and well-developed. The process often begins with medical imaging, such as MRI, which can be used to identify abnormal areas of brain tissue. Some MRI findings, such as a finding of unilateral mesial temporal lobe sclerosis (MTLS), may be highly suggestive of the seizure onset zone location; others may be less helpful. Additional location information may be gained from studies of EEG potentials obtained at the scalp. Typically, these studies will include a synchronized video recording of the patient. Expert clinicians carefully review these records to better understand the possible locations of the seizure onset zone. However, this information is often insufficiently precise to guide surgery or other procedures. If a more accurate location is required, electrode arrays are implanted in and/or near the brain to record the onset of seizure activity.

Knowing the location of the seizure onset zone may be used to plan for the implantation of electrodes for a neuromodulation system such as an RNS system (as well as providing guidance for surgical treatment), as shown in step 404. In step 406, the electrodes and other system components are implanted in accordance with a surgical plan. Following implantation, the system is configured with initial stimulation parameters and/or the parameters are adjusted, as shown in step 408. The patient's response to the configured parameters is observed over time, typically for several months, and seizure activity is recorded in step 410. As data accumulate and are reviewed by clinicians, a decision is made (step 412) to adjust the system parameters if the patient continues to experience seizures (step 408) or to continue to monitor the patient (step 410).

Figure 5:
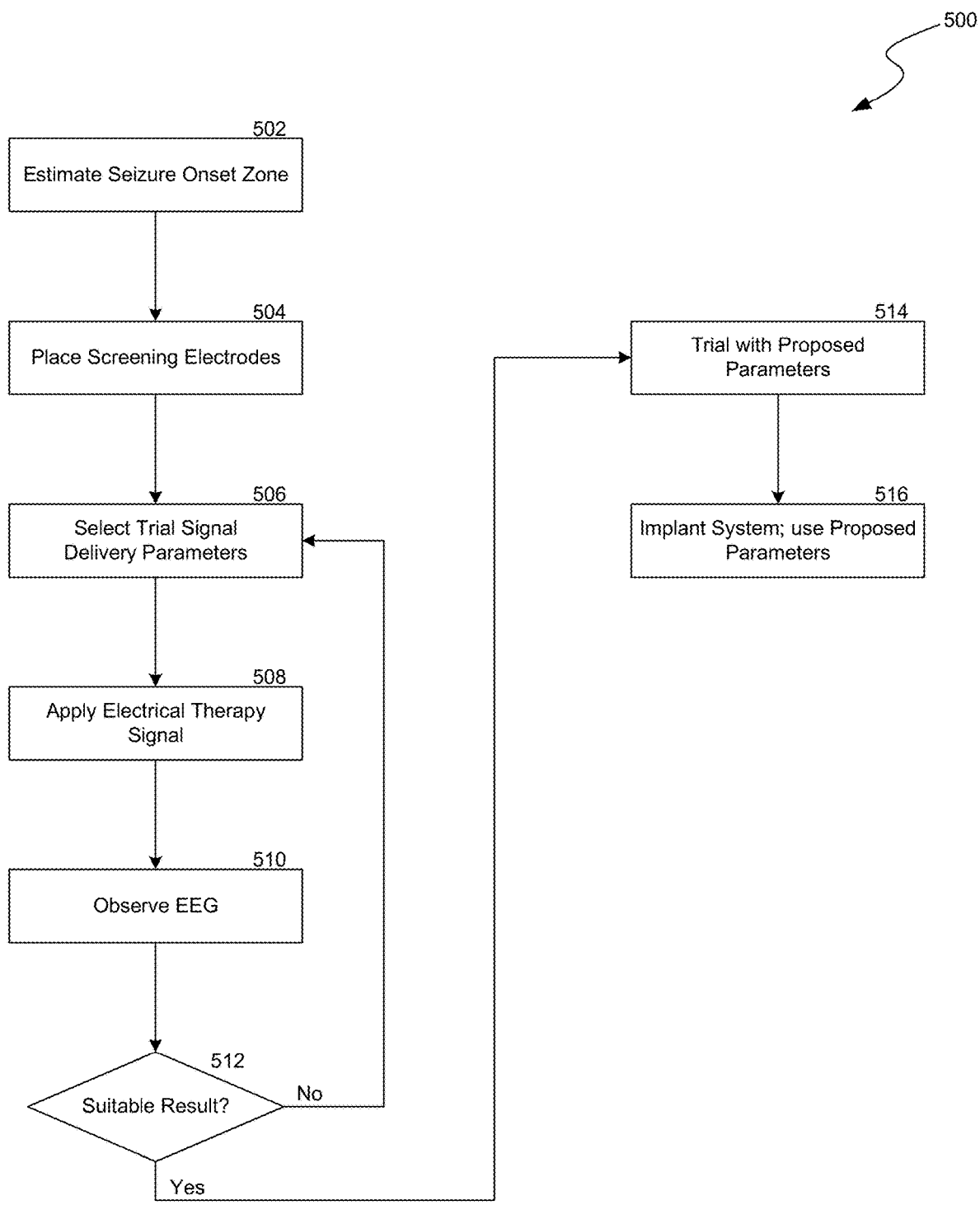
FIG. 5 illustrates a typical sequence for qualitative biomarker assessment, electrode placement, parameter confirmation, and system placement, in accordance with the prior art.

FIG. 5 illustrates a typical process 500 used to apply Chronic Subthreshold Cortical Stimulation (CSCS) in accordance with the prior art. In step 502, the seizure onset zone is estimated, generally as discussed previously with reference to FIG. 4. In step 504, temporary electrodes are placed for purposes of studying a biomarker response to trial stimulation. Such electrodes may have been placed previously as part of an effort to more accurately locate the seizure onset zone, or may be implanted for the express purpose of identifying stimulation sites. Electrodes that show "spiking" or Interictal Epileptiform Discharges (IEDs) are selected by visual observation. A set of trial stimulation parameters is selected in step 506. Stimulation is applied in step 508 while the iEEG data are monitored for changes (step 510). In step 512, the results are used to guide a decision to continue searching different stimulation parameters (step 506), or to perform a longer study with selected parameters (step 514). A permanently implanted system is placed in step 516 in accordance with the trial electrode locations and stimulation parameters.

One of the drawbacks associated with the process described above with reference to FIG. 5 is that the visual analysis of biomarker suppression is limited to the assessment of relatively easy to identify biomarkers such as IED "spikes." Conventional CSCS is also limited by the inability to assess biomarker activity during periods of trial stimulation at stimulation frequencies above several Hz, due to the stimulation artifact (e.g., the sensor picks up the therapy signal itself, rather than the patient's response to the therapy signal). By contrast, systems and methods in accordance with the present technology can track signals delivered to the patient and automatically filter out sensor data reflecting the delivered signals, or use other signal processing techniques to eliminate the artifact. In addition, conventional CSCS does not allow the physician to quantitatively compare different stimulation targets and stimulation parameters to optimize therapy. Still further, existing CSCS systems are typically not configured to monitor patients after the implant procedure to determine the effects of neuromodulation on biomarkers and adjust the stimulation parameters (including stimulation targets) to improve biomarker suppression. Aspects of the present technology address the foregoing deficits.

Figure 6A:
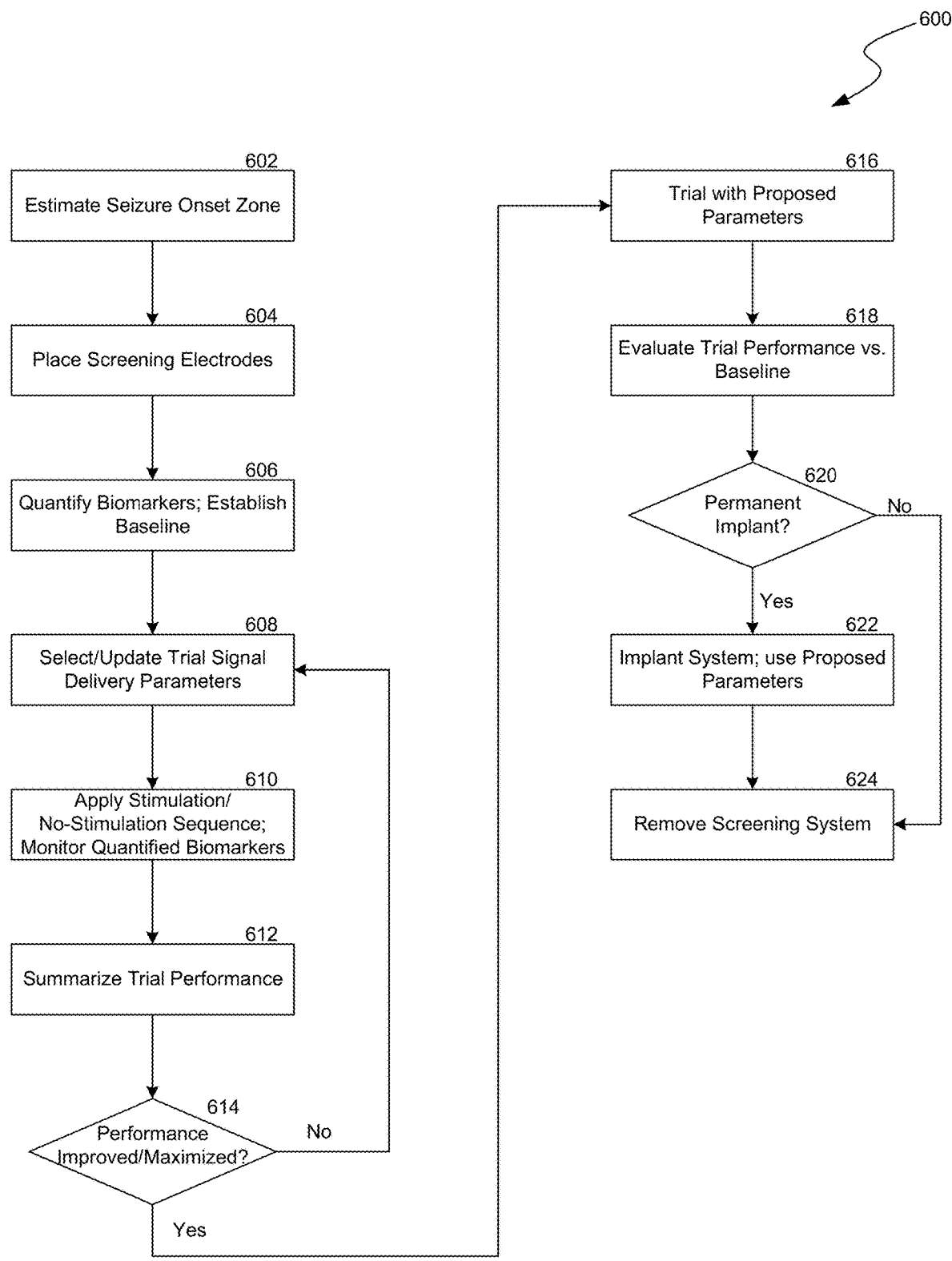
FIG. 6A illustrates a representative process for quantitative biomarker assessment, electrode placement, parameter confirmation, and system placement, in accordance with embodiments of the present technology.

FIG. 6A illustrates a representative process used to treat patients in accordance with embodiments of the present technology. In process portion 602, the seizure onset zone is estimated, e.g., using MRI and/or other suitable existing or yet-to-be-developed techniques. In process portion 604, temporary electrodes are placed for purposes of identifying and analyzing biomarker response to trial stimulation. These electrodes may have been placed previously as part of an effort to more accurately locate the seizure onset zone, and/or may be placed expressly for the purpose of the trial. For example, because the biomarker activity may have a different location than the epileptic foci, the temporary electrodes may be positioned at locations other than the seizure onset zone. In several representative examples, the electrodes used during the trial process are implanted beneath the patient's skull, and in at least some cases, beneath the dura surrounding the patient's brain. This positioning approach can apply to the sensing electrodes and/or the therapy signal delivery electrodes. In other representative examples, at least some electrodes may be positioned outside the patient's skull. For example, the sensory electrodes can be positioned on the patient's scalp to detect patient responses to the therapy signals, and/or the therapy signals can be magnetic signals, e.g., using transcranial magnetic stimulation (TMS) techniques and associated devices, rather than electrical signals. In a further particular example, TMS techniques are used to identify target neural populations at a macro or coarse level. The target populations are further narrowed down using electrical stimulation, which is also used chronically. Accordingly, the term "electromagnetic therapy signals," as used herein, covers both electrical therapy signals and magnetic therapy signals. In still further embodiments, other techniques (e.g., non-invasive techniques) can be used in process portion 604. For example, representative suitable techniques include tDCS (transcutaneous direct current stimulation), tACS (transcranial alternating current stimulation) and/or focused ultrasound.

In process portion 606, baseline biomarker data are established. For example, the biomarker data can include iEEG (intracranial electroencephalography) data which are collected and quantified. Electrodes showing significant abnormal biomarker activity are identified for further analysis. As used herein, the term "biomarker" refers to any of a number of suitable, detectable parameters or characteristics that are indicative of epileptic activity. For example, EEGs identifying interictal epileptiform discharges represent one type of biomarker. A specific measure of the biomarker is the number of interictal spikes per unit time, e.g., the number of recorded spikes per minute. Another measure of biomarker activity includes spectral power ratios, which shows improved promise as a predictor, and is described further below with reference to FIGS. 6B-7C. Both of the foregoing measures are examples of processed biomarker data, based on raw biomarker data (e.g., raw iEEG data).

Whatever biomarker is used, an aspect of the present technology is quantifying the biomarker, or changes in the biomarker, in a manner that simplifies establishing a correlation between changes produced by the applied electrical therapy signal and changes in the biomarker. This approach can increase the number of practitioners who are able to prescribe suitable electrical therapy techniques for patients suffering from epilepsy. For example, while identifying the number of spikes per unit time is one technique for quantifying a biomarker, it may not be as predictive of successful patient outcomes as spectral data analysis. But spectral data analysis may be difficult for a practitioner to perform simply by scanning graphical output illustrating spikes.

Figure 6B:
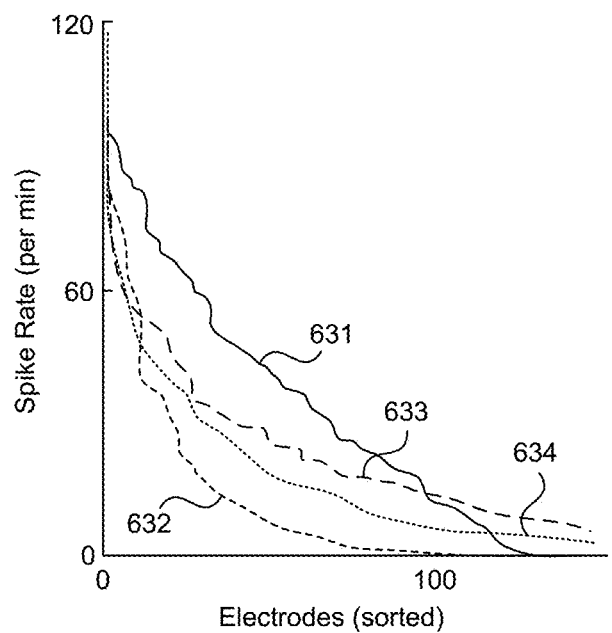
FIG. 6B is a graph illustrating spike rates detected by specific electrodes with and without stimulation in accordance with embodiments of the present technology, within and outside a seizure onset zone.

FIG. 6B is a graph that is representative of feedback received from a patient receiving stimulation in accordance with embodiments of the present technology. The graph displays recorded spike rates (as spikes per minute) as a function of sensing electrode. The spikes are recorded via the sensing electrodes described above. The sensing electrodes are sorted generally from those that record the highest spike rates to those that record the lowest spike rates. In this particular instance, over 100 sensing electrodes were implanted in the patient. In this case, the sensing electrodes both delivered electrical signals, and received feedback from the patient in the form of electrical spikes (e.g., interictal spikes). Suitable filtering techniques were used to screen out the delivered signals from the recorded physiological responses. Line 631 illustrates the spike rate for each electrode, without the system delivering electrical stimulation. Line 632 illustrates the results for each electrode, with stimulation provided. In particular, the stimulation that was applied had the following characteristics:
 frequency: 2 Hz
 pulse width: 400 μsec
 amplitude: 1-2 volts
 waveform: continuous delivery of charge-balanced biphasic, symmetric, square pulses.

As seen in FIG. 6B, the electrical stimulation resulted in a significant decrease in the spike rate for electrodes located in a seizure onset zone (e.g., the zone in which seizures are expected to begin). Lines 633 and 634 illustrate results for electrodes located outside the seizure onset zone. In particular, line 633 illustrates feedback from electrodes located outside the seizure onset zone, without stimulation applied, and line 634 illustrates feedback from the same electrodes, with stimulation applied. As shown, the reduction in spike rate is significantly less for electrodes located outside the seizure onset zone than for electrodes located within the seizure onset zone. While the illustrated results compare electrodes within and outside the seizure onset zone, it is believed that the networks associated with neurons in the onset zone result in the onset zone having complex, e.g., "fuzzy" borders or bridge regions. Accordingly, the ability to obtain effective results is not expected to be limited to only the onset zone. The approach described herein is instead more instrumental, data-driven, objective, and less dependent on identifying seizure onset zones, and associated clinician interpretations.

Figure 6C:
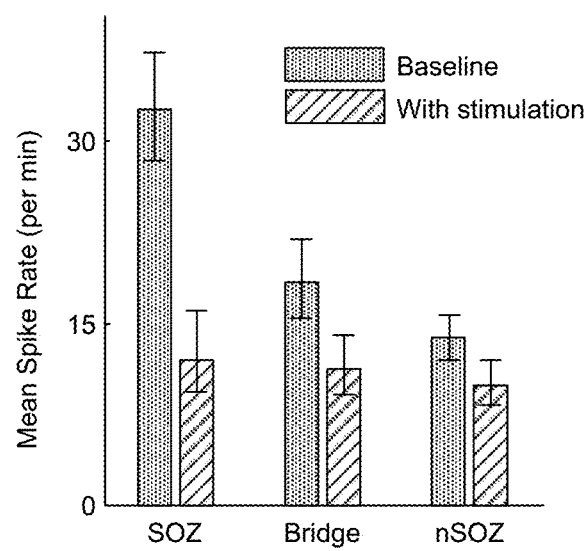
FIG. 6C is a graph illustrating the mean spike rate per minute for electrodes within the seizure onset zone, outside the seizure onset zone, and in an intermediate region, before stimulation and after stimulation, in accordance with embodiments of the present technology.

FIG. 6C illustrates the mean spike rate, per minute, within the seizure onset zone ("SOZ"), outside the seizure onset zone ("nSOZ"), and in the border or bridge region of the seizure onset zone. As indicated, stimulation produced a significant effect on spike rate compared to baseline (no stimulation), with a greater effect within the seizure onset zone, a decreasing effect in the bridge region, and a further decrease in effect outside the seizure onset zone.

Figure 6D:
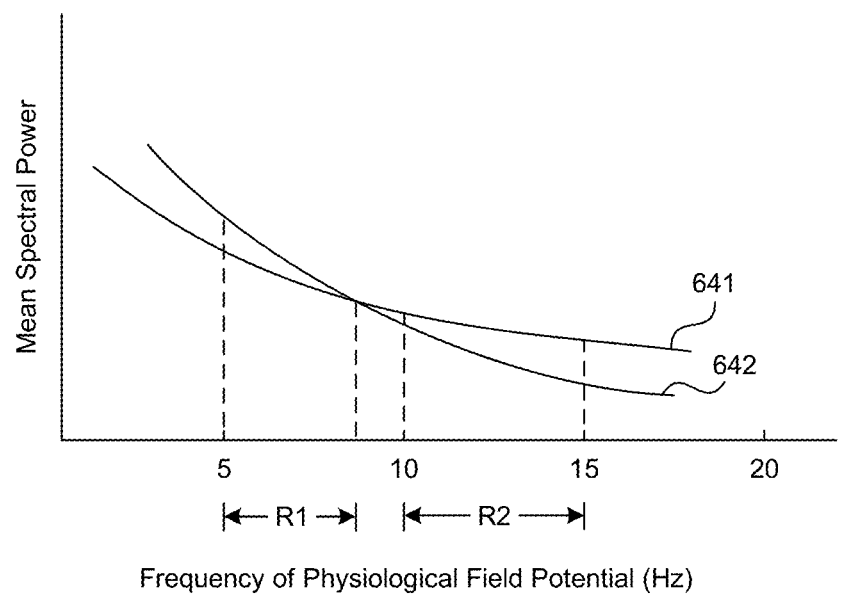
FIG. 6D is a simplified spectral power plot illustrating mean spectral power as a function of the frequency of the patient's physiological field potentials, for assessing biomarkers in accordance with embodiments of the present technology.

A processed biomarker that is even more difficult to readily assess without automation is a spectral power ratio. FIG. 6D is a simplified graph illustrating the mean spectral power of the patient's physiological response, as a function of the frequency content of the patient's physical field potential, for a particular electrode implanted in the patient, without stimulation applied (line 641) and with stimulation applied (line 642). In this representative example, the frequency spectrum is divided into two ranges: R1 (5 to 8 Hz), and R2 (10 to 15 Hz). Spectral power analysis can include obtaining a ratio of power in one frequency range to power in another frequency range. By using such a ratio, artifacts that may vary as a function of the time at which the signals were recorded, among other factors, can be accounted for. With specific reference to the ranges shown in FIG. 6D, the mean spectral power in range R2 divided by the mean spectral power in range R1 is lower when the patient receives stimulation (line 642) than when the patient does not (line 641). Accordingly, this simplified version of a spectral power analysis can be used to readily quantify a correlate of patient outcomes, despite the potentially complex and difficult-to-visualize parameter of spectral power. More generally, a change (up or down) in spectral ratio values can correlate with potential benefits for the patient. Initial results indicate that such a correlation can be better than one that relies on numbers (or other characteristics) of spikes, as described further below.

Figure 6E:
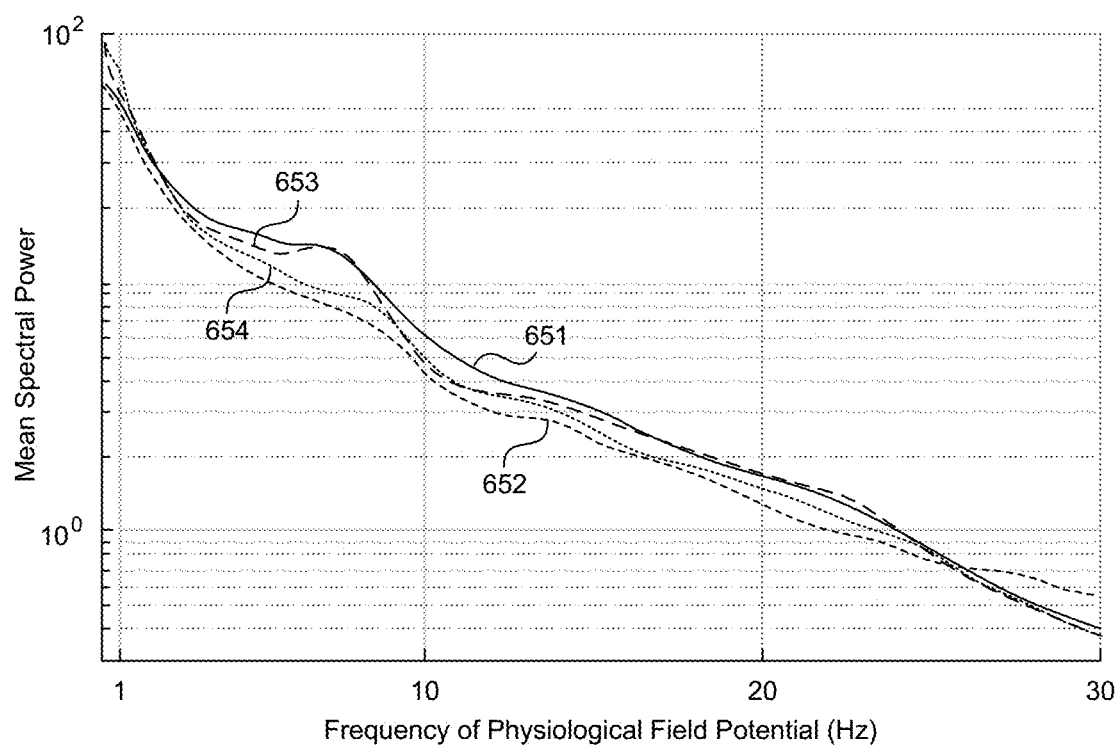
FIG. 6E is a spectral plot of patient data illustrating mean spectral power for all the electrodes shown in FIG. 6B, as a function of physiological field potential frequency, with and without stimulation, for assessing biomarkers in accordance with embodiments of the present technology.
Figure 6F:
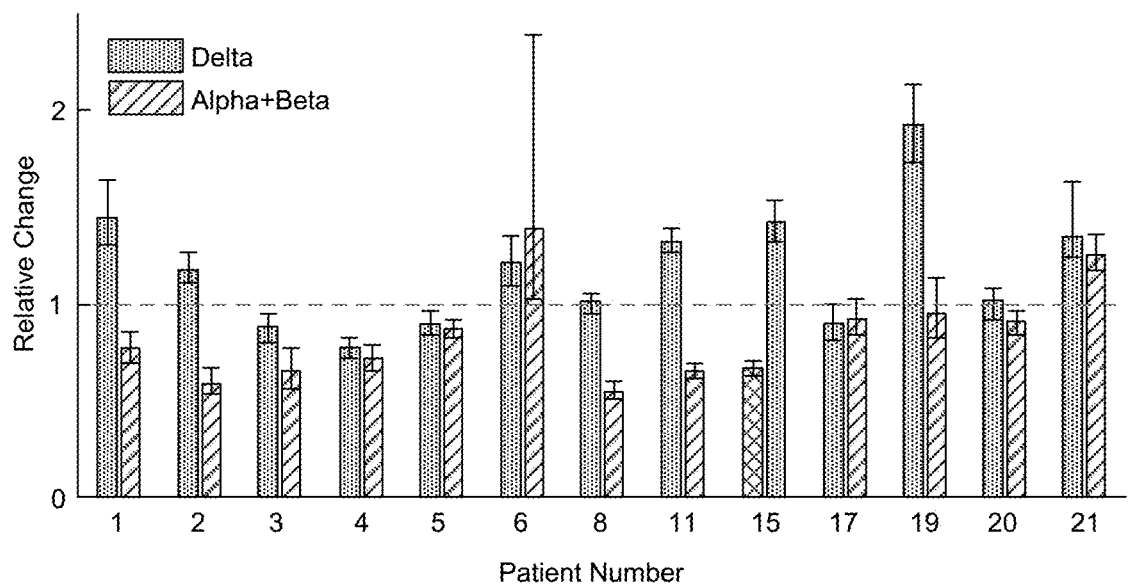
FIG. 6F illustrates the relative change in delta power, and in alpha and beta power, for individual patients, in accordance with embodiments of the present technology.

FIG. 6E illustrates mean spectral power as a function of frequency recorded within the seizure onset zones, with the stimulation off (line 651), and with the stimulation on (line 652), as well as for an electrode outside the seizure onset zone, with stimulation off (line 653) and with stimulation on (line 654). The mean spectral power corresponds to the electrical power of recorded physiological signals, e.g., over the course of tens of seconds, and is illustrated on a logarithmic scale. This graph, and ratios obtained from this graph in the manner described above with reference to FIG. 6D, indicate that at lower physiological response frequencies (e.g., less than about 3 Hz), the mean spectral power with and without stimulation has one ratio (e.g., about 1) and at between about 3 Hz and about 26 Hz, the ratio changes (as indicated by the separation between lines 651 and 652). Overall, the mean spectral power for all electrodes for both inside and outside the seizure onset zone decrease as a function of the frequency of the physiological field potential. FIG. 6F indicates that the relative change at delta frequencies (e.g., 1-4 Hz) and at combined alpha and beta frequencies (8-20 Hz) varied significantly by patient. FIGS. 7A-7C, discussed below, break this information down to identify correlations between spectral power in these frequency bands, and improvements in patient outcome.

FIGS. 7A-7C each illustrate three graphs arranged in columns 1, 2, and 3, identifying the relationship between patient outcomes and changes in physiological parameters before and after stimulation. For the graphs in column 1, the measure of patient outcome is epilepsy severity. In column 2, the patient outcome measure is seizure frequency, and in column 3, the patient outcome measure is seizure freedom. The horizontal scale is linear for column 1, and logarithmic for columns 2 and 3. The change values on the vertical axis refer to the associated parameter with stimulation applied, divided by the same parameter without stimulation applied.

The graphs of FIG. 7A illustrate that the change in spike rate between baseline and stimulation is not well correlated with any of the patient outcome measures.

In FIG. 7B, the vertical axis identifies the change in delta power (1-4 Hz) normalized by the change over the entire alpha, beta, and delta frequency band (1-20 Hz). As shown in column 3, the change in delta power correlates well with seizure freedom.

In FIG. 7C, the vertical axis identifies change in alpha and beta power (8-20 Hz), again normalized by the change over the entire alpha, beta, and delta frequency band (1-20 Hz). As shown in FIG. 7C, correlations are established across columns 1, 2, and 3.

The foregoing data indicate that identifying changes in mean spectral power over selected frequency ranges in the near term (e.g., during a trial period) can be predictive of successful patient outcomes over the long term. This approach appears to be more predictive than changes in spike rate, and, because it relies on numerical analysis, is expected to be more consistent and reliable than conventional techniques that rely on practitioners "eyeballing" complex spectral data.

The foregoing analysis was performed with a (generally) fixed set of stimulation parameters. However, the analysis can be repeated over multiple parameters to identify those that have the best (or at least a better) chance of providing a successful patient outcome over the long term. For example, returning now to FIG. 6A, process portion 608 includes selecting or updating the signal delivery parameters in accordance with which the trial is conducted. Representative signal delivery parameters include: signal frequency, pulse width, duty cycle, and/or amplitude, as well as the location to which the signal is directed. Representative parameters include a frequency in the range of from about 0.1 Hz to about 1,000 Hz (e.g., about 0.1 Hz to about 20 Hz in some embodiments, and about 0.1 to about 2 Hz in some embodiments), a pulse width of about 20 μsec to about 1,000 μsec (e.g., about 100 μsec to about 500 μsec, or about 250 μsec to about 500 μsec, or about 250 μsec in some embodiments), and an amplitude range of from about 0.01 mA to about 20 mA (e.g., from about 0.1 mA to about 10 mA, or about 1 mA to about 2 mA in some embodiments). The signal can be applied at a duty cycle (e.g., about four hours on and about four hours off, about one hour on and about one hour off, about one minute on and about one minute off, about 30 seconds on and about 30 seconds off). Signal delivery parameters can be varied from one on period to another, e.g., the frequency can be varied over the course of time. In general, the shorter the on-time, the less time is required to "search" for particularly efficacious stimulation areas.

For each set of parameters, in process portion 610, biomarker data are collected and quantified during periods when trial stimulation is applied and during periods when no stimulation is applied. A representative sequence is to apply trial stimulation for five minutes, then no stimulation for five minutes, and repeat this process three times, all while monitoring the processed (e.g., quantified) biomarker for changes. Accordingly, process portion 610 can last for 30 minutes. Other representative durations include values between four seconds and ten hours, e.g., up to (and including, as specific values), four seconds, 30 seconds, 60 seconds, 10 minutes, 20 minutes, 40 minutes, one hour, two hours, four hours, five hours, eight hours, or 10 hours. Unlike existing methods, the biomarker data are quantified algorithmically. For example, the spike rate and/or spectral power ratios represent quantified biomarker data that can be easily understood via the graphs described above.

Figure 8:
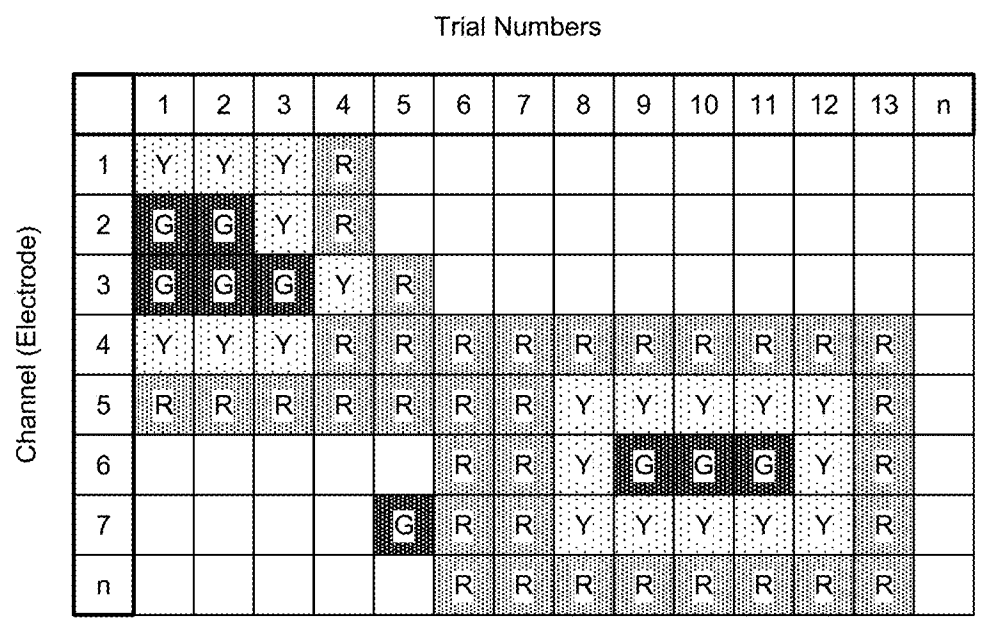

In some embodiments, the biomarker data can be further quantified in other types of visually-accessible formats. For example, FIG. 8 illustrates a table with channel number (or electrode identifier) along the vertical axis, and trial number along the horizontal axis. Each trial number can correspond to a combination of parameters other than the electrode number. For example, during a given trial, the electrical therapy signal can have a given signal frequency, pulse width, amplitude, and/or duty cycle. If a trial is successful (e.g., if it produces biomarker data that are expected to predict a successful therapeutic outcome), it can be identified by a green box, if potentially successful, by a yellow box, and if not successful, by a red box (indicated in FIG. 6E by letters G, Y, and R, respectively). When a single signal delivery parameter is varied from one trial to the next, it can be relatively easy to identify parameter combinations that produce desirable results. For example, trials 1, 2, and 3 indicate successful results for electrodes 2 and 3, and trials 9, 10, and 11 indicate successful results for electrode 6. This approach can be used to readily segregate successful electrode locations and other stimulation parameters from less effective ones. Accordingly, the change in spectral power levels shown in FIGS. 7B-7C can correspond to a one level of processed or quantified biomarker, and these data can be further processed in a manner that makes them more intuitively accessible to a practitioner.

The foregoing approach reduces the time required by the clinician to correlate changes in biomarker data with changes in signal delivery parameters. For example, this approach alleviates the need for the clinician to observe EEG data over a long period of time, reduces the level of estimating or "eyeballing" required of the practitioner, and/ or permits the use of biomarkers or biomarker correlates that are not otherwise readily visualized, such as measures of complexity or spectral properties. Interlacing stimulation intervals with no stimulation intervals over a period of time helps account for changes in the EEG that may be occurring due to processes unrelated to the application of the trial stimulation, such as a change in the alertness of the patient. Accordingly, the process can include comparing multiple stimulation-off periods to determine if the underlying EEG and biomarkers are stable, or are non-stable and appear to be affected by an unrelated process. If non-stable, the trial can be re-executed.

Returning again to FIG. 6A, in process portion 612, the results of the trial are quantified and summarized. This permits a more rigorous determination of whether improvements have been made and how such improvements compare to performance with other trial stimulation parameters (process portion 614). If further improvements are possible or likely, the process returns to process portion 608. If not, then in process portion 616, a longer sequence of trial stimulation is performed. A typical sequence is to apply trial stimulation for four hours, then no stimulation for four hours, and repeat this sequence three times. Results from this process are compared to historical data collected from other patients (process portion 618). Those data can include trial performance and biomarker changes previously observed in other patients, and also the level of performance that these patients experienced with a permanently implanted system. This information is used to help clinicians, patients and families make an informed decision about proceeding with a permanent implant (process portion 620). If a decision is made to proceed with a permanent implant, it is implanted in process portion 622, and (optionally) elements of the system specifically used for the trial process only, are removed (process portion 624). Otherwise, the screening or trial system is removed and a permanent implant is not implanted (process portion 624).

In several representative examples, the chronic or permanent implant includes electrodes carried by a substrate, which is in turn implanted beneath the patient's skull and in particular implementations, beneath the patient's dura. For example, the electrodes (sensory and/or signal delivery electrodes) can take the form of multiple electrodes carried by a flat, flexible, biocompatible substrate. A single substrate can support four, eight, twelve, and/or other suitable numbers of electrodes. In other embodiments, individual electrodes can be positioned beneath the patient's skull, with individual electrodes placed in corresponding individual holes through the patient's skull. This arrangement can be used when the number of sensing and/or signal delivery electrodes is relatively small.

Figure 9:
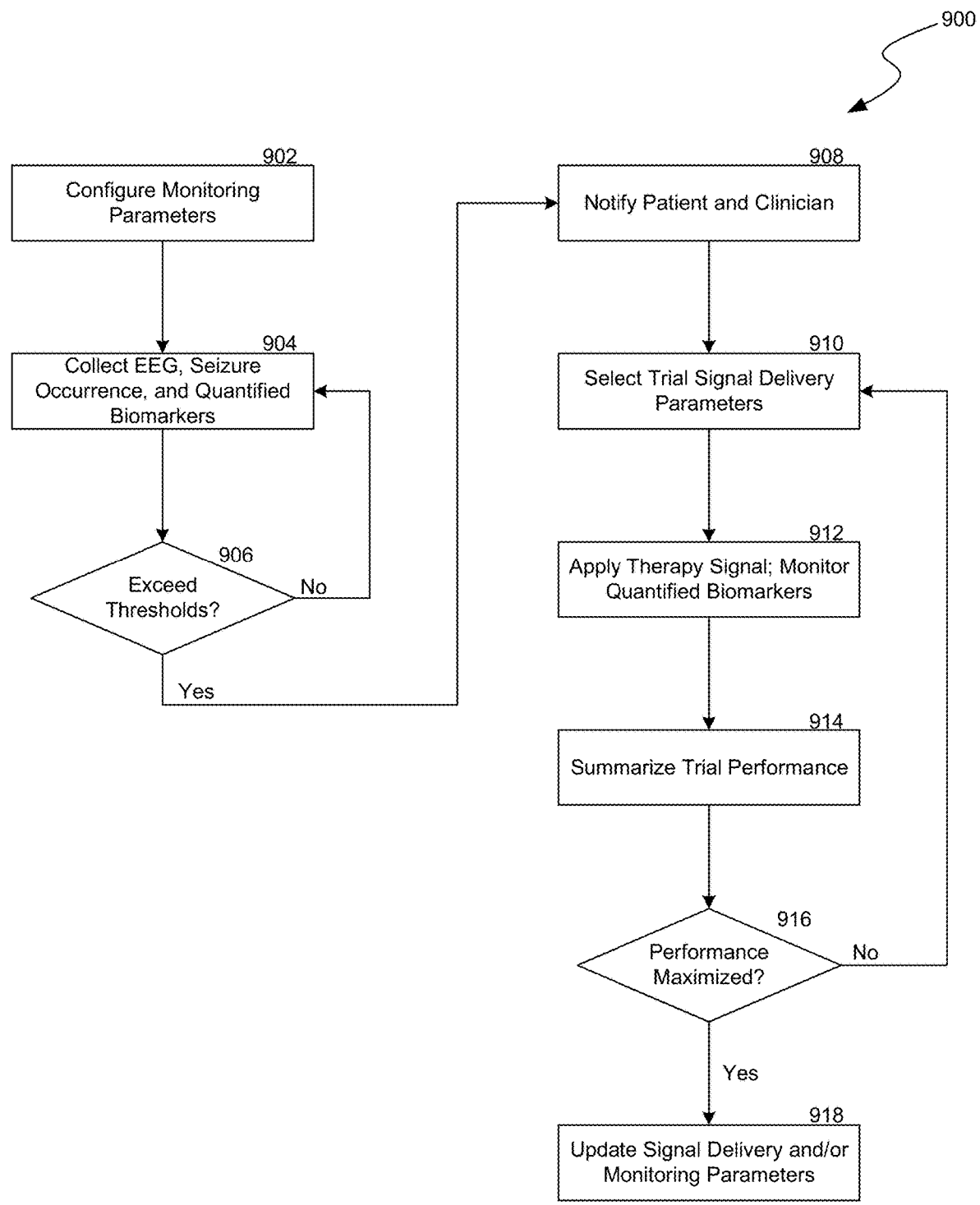
FIG. 9 illustrates a representative process for biomarker monitoring and stimulation adjustment, in accordance with embodiments of the present technology.

FIG. 9 illustrates a process in which biomarkers are monitored over extended periods of time (e.g., chronically). In process portion 902, one or more biomarkers are selected for monitoring. Decision thresholds may be set at this time, manually or automatically, and may be manually or automatically adjusted over time. A decision threshold generally corresponds to a measurable value associated with a biomarker, that indicates an unsuitable response to a therapy signal delivered in accordance with a particular parameter value or set of parameter values. One representative decision threshold includes the presence or absence of a seizure. For example, if the patient experiences a seizure, that indicates an unsuitable patient response. As another example, a significant change (e.g., three standard deviations) in a biomarker or processed biomarker value can also serve this function. For instances in which a seizure or seizure event is used as the trigger, the patient may, at least for a period of time, have a separate seizure detector to provide this information. Biomarkers are typically chosen based on results from the initial trial stimulation of the patient and typically show the greatest change in response to a therapy signal delivered in accordance with one or more parameter values. While the change is generally a desired improvement, this portion of the process 900 is directed to identifying undesired changes.

Biomarker data and other data related to the disease are collected over time (process portion 904), and compared to one or more threshold values in (process portion 906). If the biomarkers do not exceed the threshold(s), the system continues to monitor. If the biomarkers do exceed one or more thresholds, a notification is sent to patients, caregivers, and/or clinicians (process portion 908). This allows clinicians to make adjustments to the system, ideally before the system has lost efficacy and seizures begin to re-occur. In other embodiments, rather than exceeding a threshold, a decision may be triggered when a threshold value is underrun. Accordingly, and more generally, process portion 906 represents determining if the quantified biomarker(s) are outside a limit, window, envelope, or other suitable criteria.

In process portions 910, 912, 914, and 916, new stimulation parameters are configured and trialed, in response to the indication that the existing stimulation parameters produced results that exceeded one or more threshold limits. These process steps proceed in a manner similar to that described previously, only in this case, the stimulation and biomarker collection is performed using the already permanently implanted system. In process portion 918, the signal delivery parameters and/or the monitoring parameters are updated, based upon the results from process portions 910, 912, 914, and 916. For example, the waveform characteristics of the electrical signal and/or the target location to which the electrical signal is directed can be altered. In at least some examples, the parameters in accordance with which the patient's response is detected and/or monitored can be changed. For example, the sensitivity of the sensing electrode and/or associated circuit can be adjusted, and/or the location of the sensing electrode can be changed.

Figure 10:
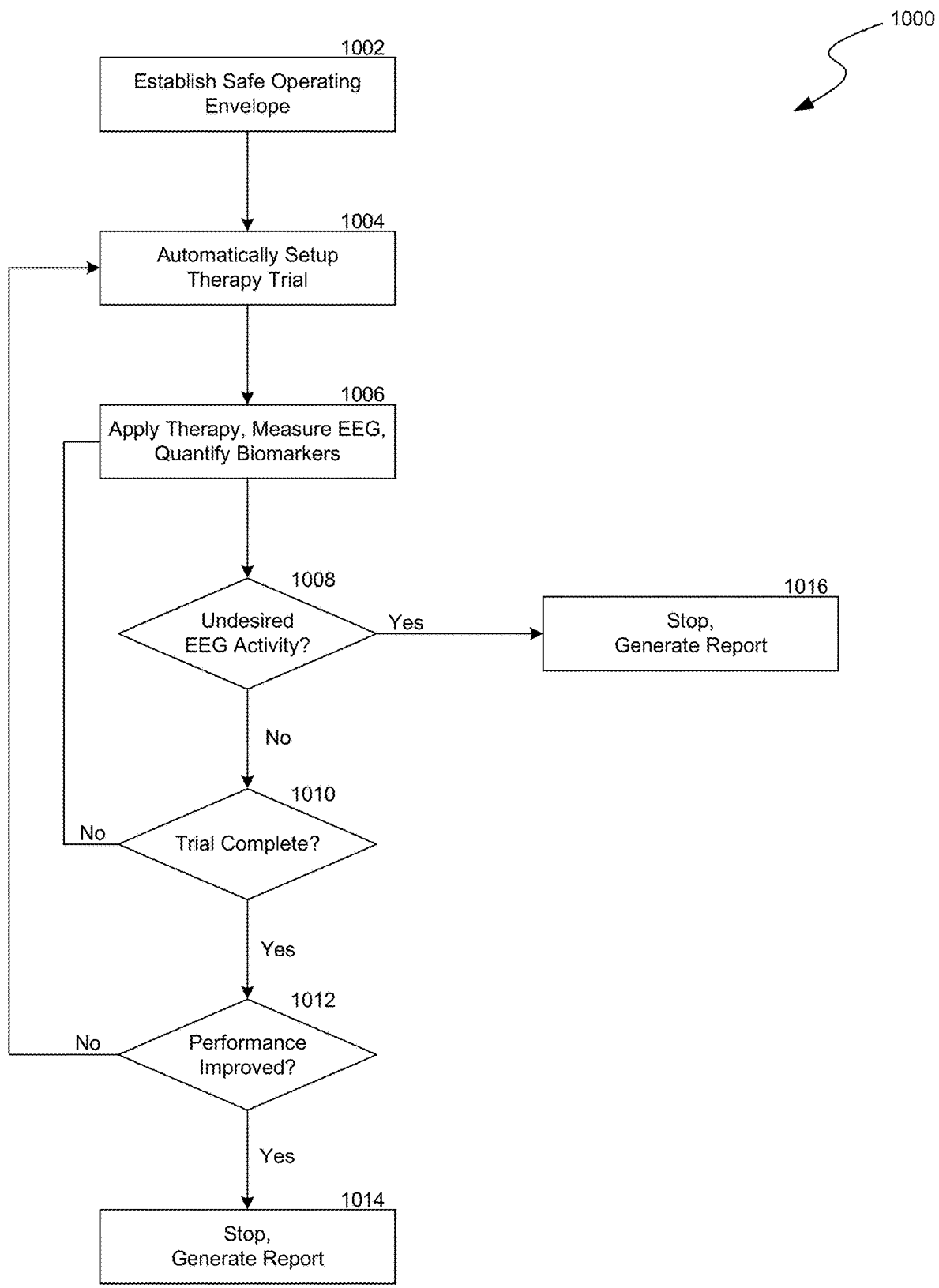
FIG. 10 illustrates a representative process for automating stimulation trial sequencing and biomarker assessment, in accordance with embodiments of the present technology.

FIG. 10 is a flow diagram illustrating a process 1000 in which the trial electrical therapy process is further automated. In process portion 1002, a clinician or other practitioner programs the system with a set of boundary conditions that define a safe operating area or envelope. In process portion 1004, the system automatically sets up a search pattern that includes a proposed sequence of electrical therapy trials. The proposed sequence may be modified by the clinician or other personnel. In representative embodiments, the trial parameters can be automatically determined using optimization techniques, e.g., a gradient descent, or a genetic algorithm. The cost function used to optimize the trial parameters can include feedback from the patient, e.g., in the form of reporting epileptic activity. Other representative types of feedback from the patient can include quality of sleep, memory aptitude, epileptic activity, electrographic seizures, and/or the absence of side effects, including quality of sleep, memory degradation, and/or muscle capture. Muscle capture can refer to inadvertent muscle activation resulting from the applied therapy signal.

In process portion 1006, the system sequences through the proposed list of trial electrical therapy parameters. In process portion 1008, the system checks for undesired EEG activity, such as seizure activity. If such activity is detected, the system can take any of a number of suitable actions, e.g., automatically stopping the electrical therapy and generating a report (process portion 1016), or terminating the current session of trial therapy and then continuing to evaluate other trial therapy options. In some cases, process portion 1016 can include actions in addition to halting the electrical therapy signal, e.g., adjusting the patient's medications. In process portion 1010, a check is performed to confirm that a given trial is complete and that needed data has been gathered so that performance data based on quantified biomarkers can be calculated. In process portion 1012, if the performance is found to be improved, optimal, or meets another suitable metric, the automatic sequence is stopped (process portion 1014), otherwise it continues.

From the foregoing, it will be appreciated that specific embodiments of the disclosed technology have been described herein for purposes of illustration, but that various modifications may be made without deviating from the technology. For example, while representative target neural structures include the patient's neocortical regions, insula, thalamus, and/or temporal lobe, other regions and/or structures can be targeted, depending (e.g.) on the characteristics of specific patients. Any of these regions can be used for sensing and/or stimulating the patient. Individual electrodes (and/or other signal delivery devices or components) can be configured solely to receive physiological data from the patient, solely to deliver therapy signals to the patient, or both. In other examples, the practitioner can target other suitable neural targets, e.g., the interior nucleus of thalamus, and/or a peripheral nerve, e.g., the vagal nerve, trigeminal nerve, and/or other craniofacial nerve. The spectral power can be in ranges other than those specifically identified above, for example, in a range of 0.001 Hz to 1 Hz.

Certain aspects of the technology described in the context of particular embodiments may be combined or eliminated in other embodiments. For example, a given patient can receive any suitable combination of one or more of the foregoing screening, therapy and monitoring processes. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

As used herein, the term "and/or," as in "A and/or B" refers to A alone, B alone and both A and B. To the extent any materials incorporated herein by reference conflict with the present disclosure, the present disclosure controls. The following examples provide additional representative features of the present technology.

Examples

1. A system for treating epilepsy in a patient, comprising:
at least one therapy signal delivery electrode configured to deliver an electrical therapy signal to a brain of the patient;
at least one sensing electrode configured to detect one or more indications of an interictal EEG biomarker in the brain of the patient; and
one or more non-transitory computer-readable media storing computer-executable instruction that, when executed by one or more processors, cause the one or more processors to perform operations comprising:
receiving, via the at least one sensing electrode, multiple indications of the interictal EEG biomarker over a time period,
processing the multiple indications to produce a processed biomarker, and
using the processed biomarker to identify:
at least one target location at the patient's brain to receive, via the at least one therapy signal delivery electrode, the electrical therapy signal to reduce or eliminate epileptic activity in the patient, and
at least one additional signal delivery parameter in accordance with which the electrical signal is to be delivered.

2. The system of example 1, wherein the interictal EEG biomarker is a first interictal EEG biomarker, the processed biomarker is a first processed biomarker, and the time period is a first time period, and wherein the operations further include:
delivering, via the at least one therapy signal delivery electrode, the electrical therapy signal;
receiving, via the at least one sensing electrode, multiple indications of a second interictal EEG biomarker in response to the delivered electrical therapy signal over a second time period;
processing the multiple indications of the second biomarker to produce a second processed biomarker;
comparing the second processed biomarker to the first processed biomarker; and
if the comparison of the first and second processed biomarkers indicates that the electrical therapy signal did not reduce or eliminate epileptic activity, using the second processed biomarker to update the at least one target location and/or the at least one additional signal delivery parameter.

3. The system of any of examples 1 or 2 wherein the processed biomarker includes at least one of a spike rate or spectral power ratio.

4. The system of any of examples 1-3 wherein processing includes determining a spectral power ratio corresponding to the multiple indications.

5. The system of any of examples 1-4 wherein the time period is a period of four seconds, 30 seconds, up to one minute, up to 10 minutes, or up to four hours.

6. The system of any of examples 1-5 wherein the target location includes at least one of the patient's neocortical site, the patient's insula, the patient's temporal lobe, or the patient's thalamus.

7. The system of any of example 1-6 wherein the at least one additional signal delivery parameter includes at least one of a frequency in a frequency range of from 0.1 Hz to 1,000 Hz, a pulse width in a pulse width range of 20 μsec to 1,000 μsec, or an amplitude in an amplitude range of 0.01 mA to 20 mA.

8. The system of any of examples 1-7 wherein the interictal biomarkers are quantified by at least one of a spike rate or a spectral power ratio.

9. A method of treating an epilepsy patient, comprising:
estimating a seizure onset zone in a brain of the patient;
placing delivery and sensing devices, including—
at least one delivery device configured to deliver an electromagnetic signal to the estimated seizure onset zone, and
at least one sensing electrode configured to measure one or more biomarkers and/or one or more indications thereof in the estimated seizure onset zone;
delivering, via the at least one delivery device, a first electromagnetic signal to the estimated seizure onset zone;

receiving, via the at least one sensing electrode, multiple indications of an interictal EEG biomarker over a first time period and in response to the first electromagnetic signal;

during the first time period, changing at least one signal delivery parameter in accordance with which the electromagnetic signal is delivered to the estimated seizure onset zone;

analyzing the multiple indications to identify a correlation between a change in the interictal EEG biomarker and the change in the at least one signal delivery parameter; and based at least in part on the correlation, provide a recommendation for continued therapy via an electrical therapy signal over a second time period.

10. The method of example 9 wherein analyzing the multiple indications includes determining a spectral power ratio corresponding to the multiple indications.

11. The method of any of examples 9-10 wherein the interictal EEG biomarker includes at least one of a spike rate or spectral power ratio.

12. The method of example 11 wherein a favorable change in the interictal EEG biomarker includes at least one of a reduction in spike rate or a change in a spectral power ratio.

13. The method of any of examples 9-12 wherein the process of analyzing the multiple indications is performed by instructions contained on a machine-readable medium.

14. The method of any of examples 9-13 wherein—
the electromagnetic signal is delivered via transcranial magnetic stimulation, and
the electrical therapy signal is delivered via one or more implanted electrodes.

15. The method of any of examples 9-14 wherein—
the first time period is a period of 30 seconds, up to one minute, up to 10 minutes, or up to 4 hours, and
the second time period is equal to or greater than the first time period.

16. A method for treating an epilepsy patient, comprising:
applying an electrical therapy signal to the patient to treat epilepsy;
receiving multiple indications of an interictal EEG biomarker concurrently with applying the electrical therapy signal; and
in response to changes in the interictal EEG biomarker exceeding a threshold or trending toward the threshold, changing at least one element of a therapy applied to the patient.

17. The method of example 16 wherein changing the at least one element includes at least one of: (i) changing or halting the electrical therapy signal, or (ii) changing the patient's medications.

18. The method of any of examples 16-17 wherein applying the therapy signal is performed during a trial period with an external signal generator.

19. The method of any of examples 16-18 wherein applying the therapy signal is performed during a chronic therapy period with an implanted signal generator.

20. The method of examples 16-19 wherein applying the electrical therapy signal includes applying electrical signals via a first set of electrodes positioned in individual holes through the patient's skull, the method further comprising:
in response to changes in the interictal EEG biomarker, removing at least some of the electrodes to form a second set of electrodes smaller than the first set; and
delivering an electrical therapy signal to the patient's brain via the second set of electrodes.

We claim:
1. A system for treating epilepsy in a patient, the system comprising:
at least one therapy signal delivery electrode configured to deliver an electrical therapy signal to a brain of the patient;
at least one sensing electrode configured to detect one or more indications of an interictal EEG biomarker in the brain of the patient; and
one or more non-transitory computer-readable media storing computer-executable instruction that, when executed by one or more processors, cause the one or more processors to perform operations comprising:
receiving, via the at least one sensing electrode, multiple indications of the interictal EEG biomarker over a time period,
processing the multiple indications to produce a processed biomarker, wherein the processed biomarker includes a spectral power ratio corresponding to the multiple indications; and
using the processed biomarker to identify:
at least one target location at the patient's brain to receive, via the at least one therapy signal delivery electrode, the electrical therapy signal to reduce or eliminate epileptic activity in the patient, and
at least one additional signal delivery parameter in accordance with which the electrical therapy signal is to be delivered.

2. The system of claim 1, wherein the interictal EEG biomarker is a first interictal EEG biomarker, the processed biomarker is a first processed biomarker, and the time period is a first time period, and wherein the operations further include:
delivering, via the at least one therapy signal delivery electrode, the electrical therapy signal;
receiving, via the at least one sensing electrode, multiple indications of a second interictal EEG biomarker in response to the delivered electrical therapy signal over a second time period;
processing the multiple indications of the second biomarker to produce a second processed biomarker;
comparing the second processed biomarker to the first processed biomarker; and
if the comparison of the first and second processed biomarkers indicates that the electrical therapy signal did not reduce or eliminate epileptic activity, using the second processed biomarker to update the at least one target location and/or the at least one additional signal delivery parameter.

3. The system of claim 1 wherein the processed biomarker further includes a spike rate.

4. The system of claim 1 wherein the time period is a period of four seconds, 30 seconds, up to one minute, up to 10 minutes, or up to four hours.

5. The system of claim 1 wherein the at least one target location includes at least one of the patient's neocortical site, the patient's insula, the patient's temporal lobe, or the patient's thalamus.

6. The system of claim 1 wherein the at least one additional signal delivery parameter includes at least one of a frequency in a frequency range of from 0.1 Hz to 1,000 Hz, a pulse width in a pulse width range of 20 μsec to 1,000 μsec, or an amplitude in an amplitude range of 0.01 mA to 20 mA.

7. A method of treating an epilepsy patient, the method comprising:
estimating a seizure onset zone in a brain of the patient;
placing delivery and sensing devices, including— at least one delivery device configured to deliver an electromagnetic signal to the estimated seizure onset zone, and at least one sensing electrode configured to measure one or more biomarkers and/or one or more indications thereof in the estimated seizure onset zone;

during a first time period— delivering, via the at least one delivery device, an electromagnetic signal to the estimated seizure onset zone;

receiving, via the at least one sensing electrode, multiple first indications of an interictal EEG biomarker in response to the electromagnetic signal;

changing at least one signal delivery parameter in accordance with which the electromagnetic signal is delivered to the estimated seizure onset zone;

receiving, via the at least one sensing electrode, multiple second indications of the interictal EEG biomarker in response to delivery of the electromagnetic signal with the at least one changed signal delivery parameter; and analyzing the multiple first indications and the multiple second indications to identify a correlation between a change in the interictal EEG biomarker and the change in the at least one signal delivery parameter; and based at least in part on the correlation, providing, to a user, a recommendation for continued therapy via an electrical therapy signal over a second time period.

8. The method of claim 7 wherein analyzing the multiple indications includes determining a spectral power ratio corresponding to the multiple indications.

9. The method of claim 7 wherein the interictal EEG biomarker includes at least one of a spike rate or spectral power ratio.

10. The method of claim 9 wherein a favorable change in the interictal EEG biomarker includes at least one of a reduction in spike rate or a change in a spectral power ratio.

11. The method of claim 7 wherein the process of analyzing the multiple indications is performed by instructions contained on a machine-readable medium.

12. The method of claim 7 wherein— the electromagnetic signal is delivered via transcranial magnetic stimulation, and the electrical therapy signal is delivered via one or more implanted electrodes.

13. The method of claim 7 wherein— the first time period is a period of 30 seconds, up to one minute, up to 10 minutes, or up to 4 hours, and the second time period is equal to or greater than the first time period.

* * * * *